July 7, 1959 L. SHAPIRO 2,894,058

REGISTRATION SYSTEM

Filed Feb. 1, 1955 3 Sheets-Sheet 1

INVENTOR.
LOUIS SHAPIRO
BY Morris Rabkin
ATTORNEY.

INVENTOR.
LOUIS SHAPIRO
BY Morris Rabkin
ATTORNEY.

INVENTOR.
LOUIS SHAPIRO
BY Morris h. Rabkin
ATTORNEY.

United States Patent Office 2,894,058
Patented July 7, 1959

2,894,058

REGISTRATION SYSTEM

Louis Shapiro, Erlton, N.J., assignor to Radio Corporation of America, a corporation of Delaware Application February 1, 1955, Serial No. 485,426

14 Claims. (Cl. 178—5.2)

This invention relates to a system for registering one or more objects with respect to a standard or with respect to each other.

This invention may be employed in an electronic color correction system of the type described in an article "The RCA-Interchemical All Electronic Colour Correction System," by H. E. Haynes in The Penrose Annual, vol. 26, 1952, pp. 83–86, and in another article "Photographic and Photomechanical Aspects of Electronic Color Correction," by J. S. Rydz and V. L. Marquart in The Proceedings of Technical Association of the Graphic Arts, 1954, page 139.

In such a system, a flying spot scanner is employed for scanning three photographic color separations of a subject to be reproduced. By means of the scanner, electrical signals proportional to the characteristics of corresponding picture elements or areas of the separations are derived. These signals are applied to a computer, which produces corrected signals used to expose a set of corrected color separations. From the corrected color separations, a set of printing plates are made that are employed to reproduce the original subject.

The uncorrected separations must be in precise registration with each other to ensure that the scanning light spot is simultaneously focussed on corresponding picture elements of these separations. Unless such registration is achieved, the information received by the computer at any instant relates to different areas of the original colored subject, which results in incorrect or invalid computations. The diameter of a picture element may be, for example, of the order of 0.002 inch, which would correspond to the size of the scanning light spot. For such a small size light spot, an appropriate exactness of registration of the scanned separations is of the order of 0.001 inch. Optical methods, such as those employing a microscope, for achieving this precision of registration are unwieldy and time consuming.

It is among the objects of this invention to provide:

A new and improved registration system;

A new and improved registration system that is highly accurate;

A new and improved system for registering objects along a plurality of different axes of registration;

A new and improved system for detecting the condition of registration along a plurality of axes of registration at the same time.

In an embodiment of this invention, applicable to the aforementioned color correction system, a plurality of photographic separations are provided with index lines positioned at corresponding portions of the separations. A moving light spot, provided by appropriate means, scans the registrations, and separate photocells produce electrical signals when the light spot crosses the index lines. A means produces additional signals in accordance with the relative time occurrence of the electrical signals. The additional signals may be visual, for example, in the form of an oscilloscope display. Alternatively, control signals may be produced for actuating motors to reposition the separations in proper registry.

Two index lines are provided for each separation, each corresponding to a different axis of registration. Both index lines are positioned across the line of scansion, at least one of the index lines being oblique to one of the axes of registration.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
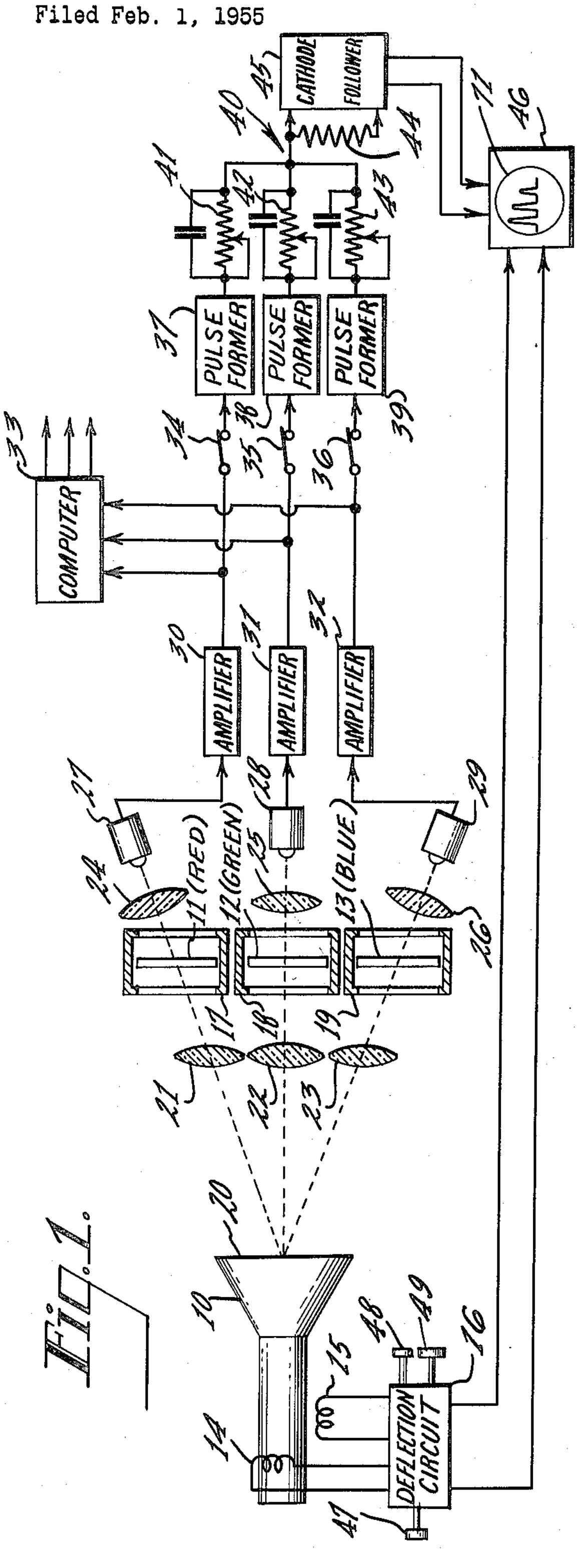
Figure 1 is a schematic diagram of apparatus embodying this invention.

In Figure 1, registration apparatus embodying this invention is shown employed with a color correction system of the type mentioned above. A flying spot kinescope tube 10 provides a moving spot of light to scan three photographic transparencies 11, 12, and 13 which are color separations of an original subject. For convenience, the separations 11, 12, and 13 will be referred to as red, green, and blue, respectively. The kinescope 10 has vertical and horizontal deflection coils 14 and 15, respectively, which are energized by appropriate deflection circuits 16. The kinescope 10 may be of the type described in an article "Electronics" June 1948, page 124 entitled "The Flying Spot Video Generator."

The color separations 11 to 13 are individually mounted in supporting frames 17, 18, and 19. A three-point register mechanism (not shown) is used in each supporting frame to position the color separations in a plane parallel to the screen of the kinescope. Separate adjustment means (not shown) are provided for two orthogonal adjustments of each supporting frame, and for a rotational adjustment of each frame where desired, so that the positions of the color separations may be individually adjusted within their planes with respect to each other and the scanning raster. Appropriate three point register mechanisms and adjusting devices are well known in the art and, therefore, are not described here.

Separate optical paths are provided for directing the scanning spot from the kinescope screen 20 to corresponding areas of the three color separations 11, 12, 13. Each optical path includes an imaging lens 21, 22, 23 between the kinescope screen 20 and the plane of the associate color separations 11, 12, and 13. The light passing through the color separations 11, 12, and 13 is concentrated by separate condenser lenses 24, 25, 26 onto separate phototubes 27, 28, 29. The output signals of the phototubes 27, 28, 29 are representative of the light passing through the associated transparencies. These phototube signals are amplified by separate amplifiers 30, 31, 32 and applied to a color computer 33. The computer 33 generates corrected signals in accordance with uncorrected signals received from the phototubes 27, 28, 29. The computer output signals may be employed for exposing corrected color separations that are subsequently used to make printing plates.

The outputs of the amplifiers 30, 31, 32 are also connected through separate switches 34, 35, 36 to pulse forming circuits 37, 38, 39. The outputs of the pulse forming circuits 37, 38, 39 are added in a summing network 40 shown as including separate adjustable resistors 41, 42, 43 with separate shunt capacitances and a common mixing resistor 44. The sum signal derived by the network 40, which is the voltage across the mixing resistor 44, is applied through a cathode follower 45 to drive the vertical deflection of an oscilloscope 46. The horizontal deflection of the oscilloscope 46 is driven by the horizontal portion of the kinescope deflection circuits 16 so that the oscilloscope 46 operates on a time base synchronous with that of the kinescope 10. Manual deflection controls 47, 48, and 49 are provided for varying the vertical position, the horizontal position, and the extent of horizontal scan of the light spot.

Figure 3:
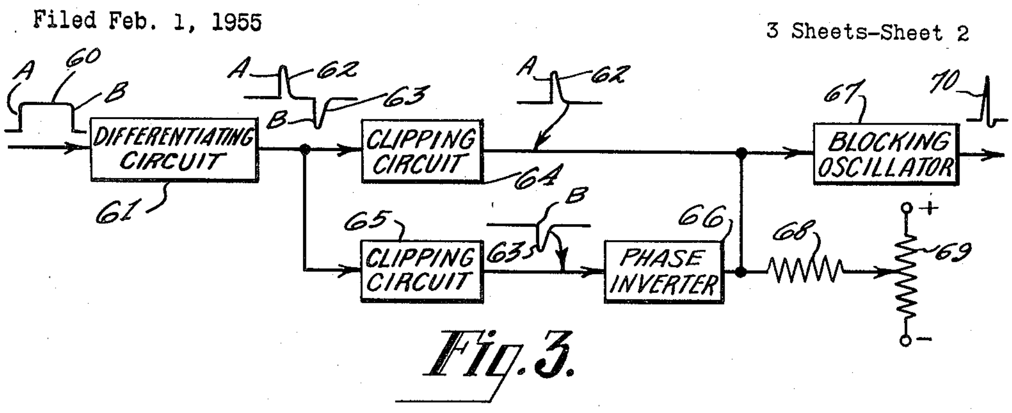
Figure 3 is a block diagram of a pulse former circuit that may be used in the apparatus of Figure 1.

A form of pulse forming circuit that may be employed is shown in Figure 3. The amplified photocell signals 60 are differentiated in a differentiating circuit 61. The differentiated pulses 62, 63 are applied to two clipping circuits 64, 65, one 64 of which clips the negative pulses 63 and passes only the positive pulses 62, and the other 65 passes only the negative pulses 63. The output of the clipping circuit 65 is applied to a phase inverter 66. The outputs of the phase inverter 66 and the other clipping circuit 64 are applied to a blocking oscillator 67. A biasing resistor 68 and biasing potentiometer 69 are shown to indicate the adjustment of the triggering voltage of the oscillator 67. Appropriate forms of clipping and blocking oscillator circuits are described in the book "Waveforms," vol. 19, Radiation Laboratory Series, McGraw-Hill, 1948, at pages 45 and page 218, respectively.

Figure 2:
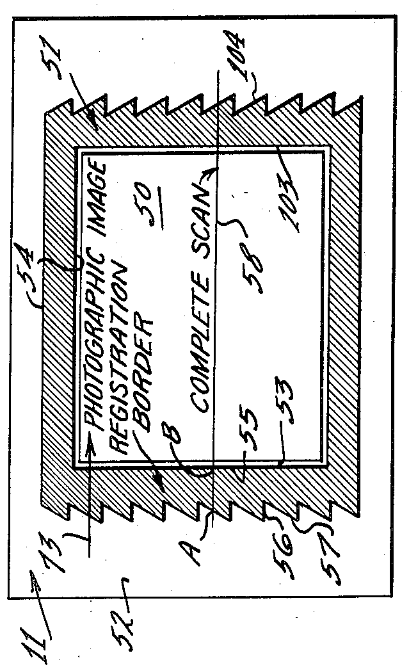
Figure 2 is a view of the face of a photographic plate that is provided with a registration border embodying this invention and which may be used in the apparatus of Figure 1.

In Figure 2, a view of the face of the red color separation 11 is shown. The separation 11 may be a glass plate having a rectangular photographic image area 50. Surrounding the image area 50, is an opaque registration border 51. The remaining area 52 of the glass plate is transparent. The registration border 51 frames the image area 50 and is spaced therefrom by a narrow transparent strip 53. The registration border 51 has straight top and bottom edges 54 parallel to the top and bottom edges of the image area 50. The inner side edges 55 of the registration border 51 are also straight and parallel to the side edges of the image area 50. The outer side edges of the border 51 are toothed and made up of a series of short lines 56 parallel to the edges 54 and connected by a series of oblique lines 57. The other separations 12 and 13 have registration borders (not shown) identical to that 51 of the separation 11.

The registration borders 51 may be formed photographically on the separation plates 11, 12, 13 during the photographic process of deriving the separations from the original subject. Alternatively, the registration borders 51 may be formed of metallic foil and attached to the separations 11, 12, 13. The use of metallic foil offers the advantage of extremely sharp edges. The borders 51 may also be imprinted on the separations by means of ink. Whatever the method employed, the border 51 should have light transmission characteristics that are distinctly different than those of immediately adjacent parts of the separation. Thus, the border 51 may be transparent, and immediately surrounding areas opaque. The separation frames 17, 18, 19 may also be employed to present the registration borders, since these frames 17, 18, 19 provide a firm support for the separations 11, 12, 13.

The separations 11, 12, and 13 are generally mounted in their respective frames 17, 18, and 19 with the top and bottom edges of the image area 50 horizontal and substantially parallel to the horizontal trace 58 of the scanning light spot. The side and top edges of the image area 50 provide two orthogonal axes of registration for the separations 11, 12, 13. The registration border edges 55 and 57 both cross the trace 58 of the scanning spot.

Figure 4:
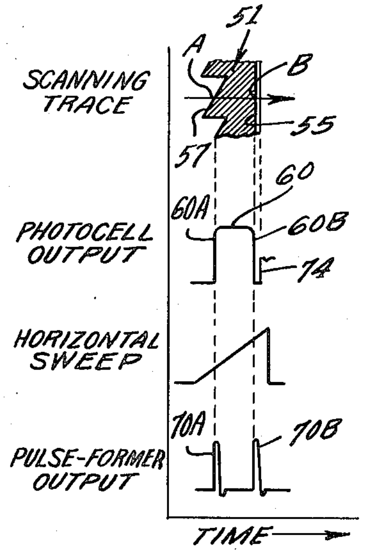
Figure 4 is an idealized graph of waveforms occurring at various portions of the apparatus of Figure 1.

The time relationship of waveforms occurring in the system of Figures 1 and 3 and the crossing of the left side of the registration border 51 by the scanning trace 58 is shown in Figure 4.

Figure 5:
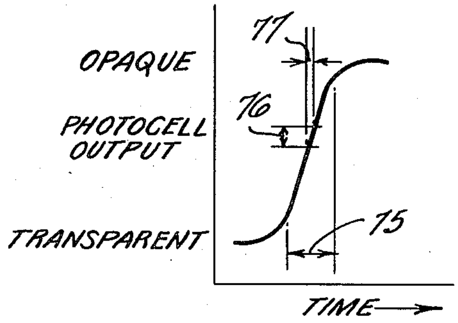
Figure 5 is an idealized graph of the photocell output waveform of the apparatus of Figure 1.

The operation is first described with the switch 34 closed and the switches 35 and 36 open. As the scanning light spot traverses the transparent outer portion 52 of the separation 11, the photocell output voltage is at a maximum negative level as indicated in Figures 4 and 5. As the light spot crosses the left edge 57 of the opaque border 51, the photocell voltage rises relatively abruptly to a less negative level to provide the leading edge 60A of a pulse 60. The photocell voltage remains at that less negative level until the spot crosses the edge 55 into the transparent strip 53. At that time, the photocell voltage falls abruptly back to the maximum negative level producing the trailing edge 60B.

The differentiating circuit produces two pulses 62 and 63 corresponding respectively to the leading and trailing edges 60A and 60B. The positive pulse 62 triggers the blocking oscillator 67 to produce a sharp voltage pulse 70A. The negative pulse 63 is inverted and triggers the oscillator 67 again to produce another voltage spike 70B. The pulses 70A and 70B are displayed as the vertical deflection of the oscilloscope 46 which operates on the same horizontal time base as the kinescope 10. Thus, the relative position of the pulses 70A and 70B on the oscilloscope face 71 corresponds to the relative times of crossing of the light spot over the edges 57 and 55 of the border 51.

The green and blue channels operate individually in the same manner as described above for the red channel. For simultaneous operation of all three channels, the resistors 41 to 43 are adjusted to provide different amplitudes for the oscillator spikes 70 from the respective channels. Thereby, the pulses 70 from each channel may be identified and distinguished from those produced in the other channels, as shown in the top line of Figure 6.

With the switches 34 to 36 all closed, information as to the relative positions of the separations 11, 12, 13 is provided. Consider the situation of the three pulses 70B corresponding to the border edges 55 of the separations 11, 12, and 13 occurring as shown in the top line of Figure 6 (on an expanded time base scale). This display indicates that the light spot first crossed edge 55 of the red separation 11, then edge 55 of the green separation 12, and finally edge 55 of the blue separation 13. Thus, the separations 11, 12, and 13 are all out of sideways registry and in relative positions corresponding to the displayed positions of the pulses 70B.

If the red and blue separations 11 and 13 are in sideways registry, the pulses 70B are simultaneously produced by the circuits 37 and 39. These simultaneous pulses are added in the network 40 to produce the composite spike 72 (bottom line of Figure 6) of amplitude equal to the sum of the two pulses. The composite spike 72 is readily distinguished from the green spike 70B to determine the relative state of sideways registry of the separations 11, 12, 13. In a similar manner, the various other combinations of out-of-register and in-register conditions may be detected. From the information displayed on the oscilloscope face 71, an operator knows which of the separations require adjustment, in which direction, and to what extent. When all three pulses 70B coincide, sideways registry is indicated.

The pulses 70A corresponding to crossings of the oblique border edges 57 are readily distinguished in position from the pulses 70B corresponding to the vertical edges 55, because the pulses 70A and 70B will be spaced on the oscilloscope face 71 a distance corresponding to the width of the border 51. The initial placement of the separations in the frames 17, 18, 19 ordinarily positions the separations in an approximate registry much closer than the width of the border 51.

Figure 6:
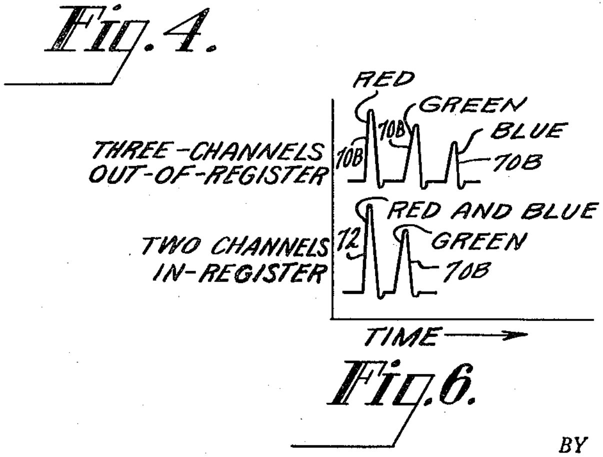
Figure 6 is an idealized graph of oscilloscope waveforms in the apparatus of Figure 1.

If the pulses 70A are displayed in the same manner as the pulses 70B shown in the top line of Figure 6, the edge 57 of the red separation 11 is crossed first, and, therefore, that separation 11 is higher than the others 12 and 13, provided that the separations are in sideways registry. Similarly, the green separation 12 is higher than the blue 13. Thus, the relative positions of the pulses 70A correspond to the relative up-and-down positions of the separations. The frames 17, 18, and 19 may be adjusted until composite spikes 72 indicate up-and-down registry of the separations in the same manner as described above for sideways registration.

In practice, one of the separations above may be registered with respect to the scanning trace 58, and then the other separations adjusted with respect to the one in proper registry. For example, with only the switch 34 closed, the red separation 11 may be scanned by a short horizontal scanning trace 73 as shown in Figure 2. The complete raster of such a trace 73, produces a series of pulses 70B corresponding to each crossing of the edge 55 along its length. If the position of these pulses 70B with respect to a grid scale (not shown) remains unchanged, the edge 55 is indicated to be vertical. Alternatively, the edges 54 may be scanned along the horizontal by a short vertical scan. The pulses produced by crossing the edges 54 indicate whether the edges 54 are horizontal or not. The short horizontal scan 73 is preferably used for simultaneous scansion of the three separations. This registration operation is generally performed before the image areas 50 are scanned in the color correction process. Thus, the short scan 73 generally provides sufficient information for accurate registration of the separations without unnecessary loss of time.

When the light spot crosses the transparent strip 53 into the image area, a pulse 74 (Figure 4) is produced that varies in amplitude depending upon the density of the image area 50 at the point of crossing. To prevent spurious triggering of the oscillator 67 at that time and again upon flyback of the trace 73 to the transparent area 52, the recovery time of the oscillator is made greater than the time interval involved. but less than the time interval for scansion of the border 51.

In Figure 5, there is shown an idealized graph of the amplified photocell output upon crossing the edge 57. This amplified output may be of the order of 30 volts in amplitude and has a transient waveform over a time period 75 corresponding to the diameter of the light spot, that is the time for passage from just to the left of line 57 to just to the right thereof. The blocking oscillator 67 may be adjusted to be triggered to within the order of one volt along the relatively steep portion of the waveform. With allowances for variations in the three channels, the relative voltage range 76 of reliable triggering in the three channels is indicated in Figure 6. It is seen that the time period 77 of occurrence of the oscillator spikes 70 is accurate to within an amount that is a small fraction of the time period 75 corresponding to the diameter of the light spot. Accordingly, with a light spot diameter of the order of 0.002 inch, the accuracy of registry of the separations upon coincidence of the displayed pulses 70 is within 0.001 inch.

Instead of summing the oscillator pulses 70 in the network 40, electronic switching techniques may be employed for simultaneous display of the pulses 70 on the oscilloscope. Such switching techniques for simultaneous oscilloscope display of a plurality of pulses are well known in the art. These switching techniques may also be employed for simultaneous display of the transient waveforms 60A and 60B directly without the use of the pulse former circuits 37, 38, and 39. Coincidence of the steep portions of the waveforms indicates registry of the separations in a similar manner to that described above.

Figure 7:
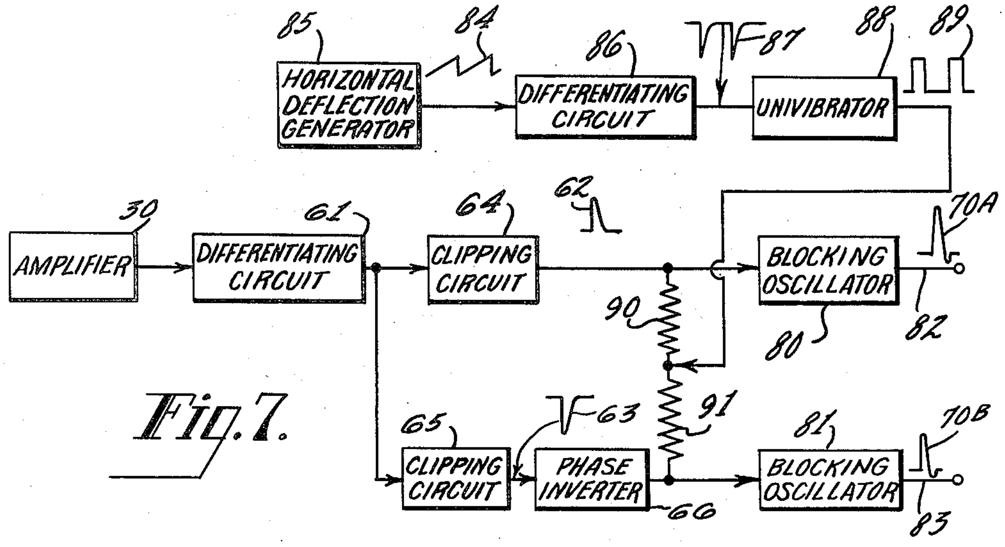
Figure 7 is a schematic block diagram of a pulse forming circuit that may be used with registration apparatus embodying this invention.
Figure 8:
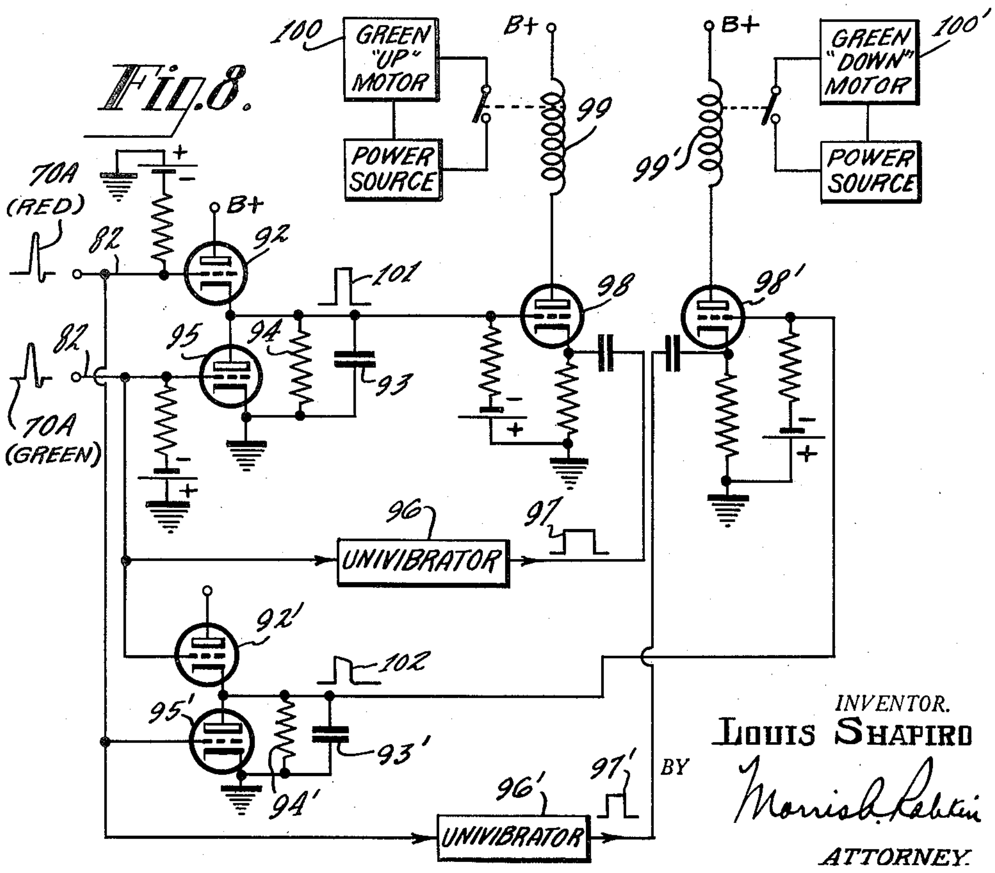
Figure 8 is a schematic circuit diagram of comparison and control circuitry that may be employed in automatic registration apparatus embodying this invention.

In Figure 7, a modified form of pulse former circuit is shown that may be employed with an automatic registration system shown in Figure 8 during a complete scan 58 of the separations. Parts previously described are references by the same numerals. Two blocking oscillators 80 and 81 are provided, one 80 of which is triggered by the pulses 62 from the clipping circuit 64, and the other 81 of which is triggered by the pulses 63 from the clipping circuit 65. Thus, pulses 70A and 70B corresponding to the border edges 57 and 55, respectively, are produced on separate channels 82 and 83.

The horizontal sweep 84 produced by the generator 85 is differentiated by the circuit 86 to provide pulses 87 at the flyback of the scanning trace. The pulses 87 trigger a univibrator 88 which produce gating pulses 89 that are timed to occur during the period that the scanning trace crosses the border 51. The gating pulses 89 are applied to the biasing resistors 90 and 91 of the oscillators 80 and 81, respectively. As a result the oscillators 80 and 81 can be triggered only during the period from just before until just after the spot crosses the registration border 51. The blocking oscillator recovery time is made long enough to prevent false triggering from the pulses 74 as previously described. All of the channels have separate pulse former circuits of the type shown in Figure 7 which are gated from a common univibrator 88.

In Figure 8, an automatic pulse comparison and registration system is shown in which the green channel pulses 70A are compared with the red channel pulses 70A, and in which the red separation 11 is assumed to be the standard to which the green separation is to be registered. The red channel pulses 70A are applied to the grid of a first normally cut-off triode 92 to render that tube 92 more conductive. Conduction in the tube 92 charges a capacitor 93, across which a resistor 94 is connected. The green channel pulses 70A are applied to the grid of a second normally cut-off triode 95 to render that tube 95 conductive. The tube 95 is connected across the capacitor 93 and discharges it upon conducting. In a similar manner, the red and green pulses 70A are respectively applied to the tubes 95′ and 92′ to discharge and charge, respectively, the capacitor 93′. Parts referenced by the numerals with the addition of a prime (′) operate in the same manner as the parts with the same numerals. The green and red pulses are also applied to separate univibrators 96 and 96′, respectively. The univibrator pulses 97 and 97′ are applied to the cathodes of separate normally cut-off triodes 98 and 98′, respectively. The voltages across the capacitors 93 and 93′ are respectively applied to the grids of the triodes 98 and 98′. Separate relays 99 and 99′ are respectively connected in the anode circuits of the tubes 98 and 98′. When energized, the relays 99 and 99′ respectively close power circuits to motors 100 and 100′ that respectively adjust the green separation from 18 up and down. The two motors 100 and 100′ may be replaced by a single direct current motor (not shown) with the relays 99 and 99′ operating to control the direction of energizing current and, thereby, the direction of adjustment by the single motor.

If the red pulse 70A occurs first, the capacitor 93 is charged through the tube 92 and then, upon occurrence of the green pulse 70, discharged through the tube 95. The resulting pulse 101 across the capacitor 93 has a duration proportional to the time between the red and green pulses. This pulse 101 renders the tube 98 conductive to energize the relay 99 for a short time period and, thereby, to energize the "up" motion 100 to correct a small amount for the green separation being too low.

A spurious pulse 102 is produced by the charging of the capacitor 93′ upon the occurrence of the green pulse 70A. This pulse 102 has a duration determined by the time constant of resistor-capacitor combination 94′ and 93′. The univibrator pulse 97′, produced upon the occurrence of the red pulse 70A is of sufficient duration to hold the tube 98′ cut off for the period of the spurious pulse 93′. The univibrator pulse 97 is initiated by the green pulse 70A and, therefore, occurs after the pulse 101 has terminated. Consequently, the pulse 97 does not affect the operation of the tube 98 and relay 99.

In a similar manner, if the green pulse 70A occurs first the "down" motor is momentarily energized to correct for the green separation being too high. A circuit similar to that of Figure 8 is provided for comparing the red and green pulses 70B to register the red and green separations sideways. Likewise two additional circuits like that of Figure 8 to compare the red and blue signals 70A and 70B, respectively and to position the blue separation in registry with the red separation. Thus, during a complete color-correction scan of the three separations, the separations may be repeatedly adjusted small amounts to ensure proper registration for each horizontal scanning trace.

In general, complete registration involves alignment of six degrees of freedom for each separation. These six degrees of freedom comprise three orthogonal lateral movements and three rotational movements about three orthogonal axes. Alignment of edge 55 corresponds to a horizontal lateral adjustment while alignment of edge 57 corresponds to a vertical lateral adjustment.

The portion of the registration border 51 on the right side of the separation (Figure 2) offers two additional items of information which may be correlated to the four degrees of freedom that remain to be accounted for. Two of these remaining four degrees of freedom can be eliminated from the registration problem by precise mechanical construction. As an example, we may assume that any rotational movements about the two axes in the plane of the separations are negligible and therefore, require no attention during the registration procedure. Under these circumstances, the edges 103 and 104 on the right side of the border 51 may be used to derive registration information about the remaining two degrees of freedom. The alignment of the edges 103 of the borders 51 of two separations may be used to indicate proper lateral adjustment along an axis orthogonal to the plane of the separations. Consequently, if the edges 103 of two separations are not in registry, as indicated by the relative time occurrence of pulses derived in a manner similar to that described above, a magnification correction is indicated. The magnification correction may be performed by adjusting the appropriate one of the imaging lenses 21 to 23. Alignment of the edges 104 of two separations may be used to indicate registration of these separations about that axis which is orthogonal to the plane of the separations. If the edges 104 are not aligned, correction may be made by rotating one of the separations in its own plane.

This system is not limited in its application to registering a stationary object or objects such as in the system described above. It may also be used to register moving objects such as a web. In a registration system for a web, the scanning light spot may be moving in the manner described above, or a fixed light spot may be employed and the web movement employed as the scansion time base.

Thus, it is seen that a new and improved registration system is provided by accurately detecting the out-of-register condition of one or more objects and for precisely positioning the objects in registry.

What is claimed is:

1. A system for use in registering a plurality of photographic records having index means thereon, said system comprising means for producing and directing a moving light spot to scan said index means of different records simultaneously, separate light sensitive means arranged to be operatively associated with said light spot means and said records for producing electrical signals when said light spot is directed across said index means, and additional means to which said electrical signals are applied for producing signals in accordance with the relative time occurrence of said electrical signals.

2. A system as recited in claim 1 wherein said additional means produces visual signals indicating the relative time occurrence of said electrical signals.

3. A system as recited in claim 1 wherein said additional means produces control signals in accordance with the relative time occurrence of said electrical signals, said system further comprising means responsive to said control signals for adjusting the relative position of said photographic records.

4. A system for determining registration comprising an object having two orthogonal axes of registration, an index means comprising a strip of material mounted in fixed relation to said object and having thereon two lines defined between areas of different opacity, said lines respectively corresponding to said axes of registration, means for scanning across said index line means in a predetermined direction, and means for supporting said object in a position to be scanned by said scanning means and with at least one of said index line means oblique to said scansion direction.

5. A system for determining registration comprising scanning means having a predetermined direction of scansion, an object having an axis of registration to be positioned parallel to said scansion direction, an index means comprising a strip of material mounted adjacent said object and having thereon at least one index line oblique to said scansion direction and defined between areas of different opacity, and means for supporting said object in a position to be scanned by said scanning means and with said registration axis substantially parallel to said scansion direction.

6. A system for determining registration comprising scanning means including means for producing a light spot and for directing said spot along, having a predetermined direction of scansion, a plurality of objects each having an axis of registration to be positioned parallel to said scansion direction and at least two index line means respectively orthogonal and oblique to said axis of registration and means for supporting said objects in positions to be scanned by said scanning means and with said registration axis substantially parallel to said scansion direction.

7. A system for use in registering a plurality of photographic records comprising a different plurality of index means for each of said records corresponding respectively to two orthogonal axes of registration of the associated record, means for producing and directing a moving light spot to scan all of said index means over the same scansion line, separate light sensitive means associated with each of said records and with said light spot means for producing electrical signals when said light spot crosses said index means, and additional means to which said electrical signals are applied for producing signals in accordance with the relative time occurrence of said electrical signals.

8. A system as recited in claim 7 wherein said index line means are formed photographically on said record.

9. A system as recited in claim 7 wherein said additional means produces visual signals indicating the relative time occurrence of said electrical signals.

10. A system as recited in claim 7 wherein said additional means produces control signals in accordance with the relative time occurrence of said electrical signals, said system further comprising means responsive to said control signals for adjusting the relative position of said photographic records.

11. A system as recited in claim 7 wherein said additional means for producing signals includes means responsive to said electrical signals for producing pulses at times corresponding to the crossing of said index means by said light spot.

12. A system as recited in claim 11 wherein said index means includes means providing two contiguous areas having different light characteristics, wherein said electrical signals produced by said light sensitive means have a transient waveform corresponding to the crossing of said light spot from one of said areas to the other, and wherein said pulse producing means is responsive only to a predetermined portion of said transient signal waveform for producing said pulses.

13. A system as recited in claim 12 wherein said pulse producing means includes a different blocking oscillator associated with each of said light sensitive means.

14. A system for determining the relative positions of a plurality of objects having separate index line means, said system comprising separate means for supporting said objects, means for producing and directing a moving light spot to scan said index line means, separate light sensitive means positioned to be operatively associated with said light spot means and said supporting means for producing electrical signals when said light spot is directed across said index line means, and means for receiving said electrical signals and for indicating the relative time occurrence of said electrical signals.

References Cited in the file of this patent

UNITED STATES PATENTS

| | | |
|---|---|---|
| 2,261,848 | Goldmark | Nov. 4, 1941 |
| 2,568,543 | Goldsmith | Sept. 18, 1951 |
| 2,575,445 | Germer | Nov. 20, 1951 |